United States Patent
Tamazaki

(10) Patent No.: US 11,462,760 B2
(45) Date of Patent: Oct. 4, 2022

(54) SCANDIA-STABILIZED ZIRCONIA POWDER FOR SOLID OXIDE FUEL CELLS, METHOD FOR PRODUCING SAME, SCANDIA-STABILIZED ZIRCONIA SINTERED BODY FOR SOLID OXIDE FUEL CELLS, METHOD FOR PRODUCING SAID SCANDIA-STABILIZED ZIRCONIA SINTERED BODY FOR SOLID OXIDE FUEL CELLS, AND SOLID OXIDE FUEL CELL

(71) Applicant: DAIICHI KIGENSO KAGAKU KOGYO CO., LTD., Osaka (JP)

(72) Inventor: Fuminori Tamazaki, Osaka (JP)

(73) Assignee: DAIICHI KIGENSO KAGAKU KOGYO CO., LTD., Osaka (JP)

( * ) Notice: Subject to any disclaimer, the term of this patent is extended or adjusted under 35 U.S.C. 154(b) by 11 days.

(21) Appl. No.: 16/625,908

(22) PCT Filed: Jun. 30, 2017

(86) PCT No.: PCT/JP2017/024170
§ 371 (c)(1),
(2) Date: Dec. 23, 2019

(87) PCT Pub. No.: WO2019/003422
PCT Pub. Date: Jan. 3, 2019

(65) Prior Publication Data
US 2020/0153020 A1    May 14, 2020

(51) Int. Cl.
*H01M 8/1253* (2016.01)
*C04B 35/48* (2006.01)
*H01M 8/1086* (2016.01)

(52) U.S. Cl.
CPC ........... *H01M 8/1253* (2013.01); *C04B 35/48* (2013.01); *H01M 8/109* (2013.01)

(58) Field of Classification Search
CPC ................. H01M 8/10–1253; C04B 35/01–48
See application file for complete search history.

(56) References Cited

U.S. PATENT DOCUMENTS
5,413,880 A    5/1995 Ishii et al.

FOREIGN PATENT DOCUMENTS

| EP | 0586264 A1 | 3/1994 |
|---|---|---|
| JP | 6-107462 A | 4/1994 |
| JP | 7-6622 A | 1/1995 |
| JP | 7-69720 A | 3/1995 |
| JP | 2000-340240 A | 12/2000 |
| JP | 2002-121070 A | 4/2002 |
| JP | 2003-20272 A | 1/2003 |
| JP | 2011-79723 A | 4/2011 |
| JP | 2017-130385 A | 7/2017 |
| KR | 10-2008-0010737 A | 1/2008 |
| KR | 10-2015-0104745 A | 9/2015 |

OTHER PUBLICATIONS

Supplementary European Search Report dated Jan. 13, 2021, issued in counterpart EP application No. 17915227.7. (11 pages).
Guo et al., "Effect of alumina on the properties of ceria and scandia co-doped ziiconia for electrolyte-supported SOFC", Ceramics International, 2013, vol. 39, No. 8, pp. 9575-9582, Cited in EP Search Report dated Jan. 13, 2021 (8 pages).
Piticescu et al.,"Hydrothermal Synthesis of Zirconia Nanomaterials for Ion Conducting Applications", Semiconductor Conference, 2000, CAS 2000 Proceedings. International., IEEE, vol. 2, pp. 449-452, Cited in EP Search Report dated Jan. 13, 2021 (4 pages).
Mizutani et al., "Characterization of the $Sc_2O_3$—$ZrO_2$ System and It's Application as the Electrolyte in Planar SOFC", Proceedings of the Electrochemical Society, 1995, vol. 1995-1, No. 1, pp. 301-309, Cited in EP Search Report dated Jan. 13, 2021 (10 pages).
Haering et al., "Degradation of the electrical conductivity in stabilised ziiconia system Part II: Scandia-stabilised zirconia", Solid State Ionics, 2005, vol. 176, No. 3-4, pp. 261-268, Cited in EP Search Report dated Jan. 13, 2021 (8 pages).
International Search Report dated Sep. 12, 2017, issued in counterpart application No. PCT/JP2017/024170 (2 pages).
Notification of Reasons for Refusal dated Sep. 3, 2019, issued in counterpart JP Patent Application No. 2016-009819, w/English translation (7 pages).
Office Action dated Jun. 29, 2021, issued in counterpart Korean Patent Application No. 10-2019-7038284 (16 pages; w/ English machine translation).

*Primary Examiner* — Cynthia H Kelly
*Assistant Examiner* — Niara Trant
(74) *Attorney, Agent, or Firm* — WHDA, LLP

(57) ABSTRACT

The present invention provides a scandia-stabilized zirconia powder for solid oxide fuel cells or a scandia-stabilized zirconia sintered body for solid oxide fuel cells, each having high crystal structure stability, low grain-boundary resistivity, and high ionic conductivity; and the production methods of these. The scandia-stabilized zirconia powder for solid oxide fuel cells comprises a compound represented by formula (1): $(ZrO_2)_{1-x-a}(Sc_2O_3)_x(Al_2O_3)_a$. In formula (1), $0.09 \leq x \leq 0.11$ and $0.002 \leq a < 0.01$ are satisfied. The scandia-stabilized zirconia powder has a rhombohedral phase crystal structure. The sintered body of the scandia-stabilized zirconia powder has a cubic phase crystal structure. The sintered body of the scandia-stabilized zirconia powder has a grain-boundary resistivity of 12 $\Omega \cdot cm$ or less at 550° C.

13 Claims, No Drawings

SCANDIA-STABILIZED ZIRCONIA POWDER FOR SOLID OXIDE FUEL CELLS, METHOD FOR PRODUCING SAME, SCANDIA-STABILIZED ZIRCONIA SINTERED BODY FOR SOLID OXIDE FUEL CELLS, METHOD FOR PRODUCING SAID SCANDIA-STABILIZED ZIRCONIA SINTERED BODY FOR SOLID OXIDE FUEL CELLS, AND SOLID OXIDE FUEL CELL

TECHNICAL FIELD

The present invention relates to a scandia-stabilized zirconia powder for solid oxide fuel cells; a method for producing the scandia-stabilized zirconia powder; a scandia-stabilized zirconia sintered body for solid oxide fuel cells; a method for producing the scandia-stabilized zirconia sintered body; and a solid oxide fuel cell.

BACKGROUND ART

Solid oxide fuel cells, called "SOFCs," are known to have higher power generation efficiency than other types of fuel cells. Accordingly, SOFCs have attracted attention because they can create new power generation systems capable of effectively using energy, and their development has been actively promoted in recent years.

SOFCs are configured to comprise a single-cell structure having a fuel electrode on one surface of a solid electrolyte, and an air electrode on the opposite surface of the solid electrolyte. Yttria-stabilized zirconia $((ZrO_2)_{0.92}(Y_2O_3)_{0.08}$, hereinbelow abbreviated as "8YSZ") is well known as an electrolyte material for forming solid electrolytes. In addition, scandia-stabilized zirconia $((ZrO_2)_{0.9}(Sc_2O_3)_{0.1}$, hereinbelow abbreviated as "10ScSZ") using scandia, which is a stabilizer of zirconia, is also known as an electrolyte material for solid electrolytes. 10ScSZ is characterized in that although its mechanical characteristics, such as three-point bending strength and fracture toughness, are equivalent to those of 8YSZ, the electrical conductivity of 10ScSZ is nearly 3 times higher than that of 8YSZ.

It is known that 10ScSZ, which has a cubic crystal phase in a high temperature range, undergoes a phase transition from cubic crystal phase to rhombohedral crystal phase at around 550° C. The phase transition problematically results in a rapid drop in the electrical conductivity of 10ScSZ. That is, 10ScSZ is considered to be a material whose electrical conductivity largely depends on the temperature thereof. 10ScSZ has another problem in that the phase transition leads to a volume change, consequently facilitating the formation of fine cracks in the sintered body thereof.

As a method of improving the performance of 10ScSZ, a technique of adding a third component to form a solid solution of 10ScSZ is known (see, for example, Patent Literature 1 and 2).

CITATION LIST

Patent Literature

PTL 1: JP1995-69720A
PTL 2: JP2000-340240A

SUMMARY OF INVENTION

Technical Problem

However, conventional scandia-stabilized zirconia materials lead to a reduction in electrical conductivity due to a change in crystal structure, because the correlation between the third component and the crystal structure of scandia-stabilized zirconia has not been specifically analyzed. Therefore, there is still a problem in terms of providing a scandia-stabilized zirconia material with high ionic conductivity.

The present invention was made in light of the above. An object of the present invention is to provide a scandia-stabilized zirconia powder for solid oxide fuel cells and a scandia-stabilized zirconia sintered body for solid oxide fuel cells, each having high crystal structure stability, low grain-boundary resistivity, and high ionic conductivity; the production methods of the above; and a solid oxide fuel cell.

Solution to Problem

As a result of extensive research to achieve the above object, the present inventors found that the above object can be achieved by selecting alumina as the third component for scandia-stabilized zirconia, and setting the amount of the alumina to a specific range. The present inventors thereby accomplished the present invention.

That is, the present invention includes, for example, the subject matter described in the following Items.

Item 1. A scandia-stabilized zirconia powder for solid oxide fuel cells, comprising a compound represented by the following formula (1):

$$(ZrO_2)_{1-x-a}(Sc_2O_3)_x(Al_2O_3)_a \quad (1)$$

wherein x is $0.09 \leq x \leq 0.11$, and a is $0.002 \leq a < 0.01$, the scandia-stabilized zirconia powder having a rhombohedral phase crystal structure, a sintered body of the scandia-stabilized zirconia powder having a cubic phase crystal structure, and the sintered body of the scandia-stabilized zirconia powder having a grain-boundary resistivity of 12 Ω·cm or less at 550° C.

Item 2. The scandia-stabilized zirconia powder according to Item 1, wherein the sintered body has a grain-boundary resistivity of 60 Ω·cm or less at 500° C.

Item 3. The scandia-stabilized zirconia powder according to Item 1, wherein the sintered body has a grain-boundary resistivity of 200 Ω·cm or less at 450° C.

Item 4. The scandia-stabilized zirconia powder according to Item 1, wherein the sintered body has a grain-boundary resistivity of 1000 Ω·cm or less at 400° C.

Item 5. The scandia-stabilized zirconia powder according to any one of Items 1 to 4, wherein the crystal structure of the sintered body does not change even after heat treatment at 600° C. for 1000 hours.

Item 6. A scandia-stabilized zirconia sintered body for solid oxide fuel cells, comprising a compound represented by the following formula (1):

$$(ZrO_2)_{1-x-a}(Sc_2O_3)_x(Al_2O_3)_a \quad (1)$$

wherein x is $0.09 \leq x \leq 0.11$, and a is $0.002 \leq a < 0.01$, the sintered body having a cubic phase crystal structure, and the sintered body having a grain-boundary resistivity of 12 Ω·cm or less at 550° C.

Item 7. The scandia-stabilized zirconia sintered body according to Item 6, wherein the sintered body has a grain-boundary resistivity of 60 Ω·cm or less at 500° C.

Item 8. The scandia-stabilized zirconia sintered body according to Item 6, wherein the sintered body has a grain-boundary resistivity of 200 Ω·cm or less at 450° C.

Item 9. The scandia-stabilized zirconia sintered body according to Item 6, wherein the sintered body has a grain-boundary resistivity of 1000 Ω·cm or less at 400° C.

Item 10. The scandia-stabilized zirconia sintered body according to any one of Items 6 to 9, wherein the crystal structure of the sintered body does not change even after heat treatment at 600° C. for 1000 hours.

Item 11. A method for producing the scandia-stabilized zirconia powder according to any one of Items 1 to 5, the method comprising the following steps 1 to 3:

step 1: mixing a raw material containing a zirconium salt and a raw material containing a scandium salt, and then performing neutralization to obtain a scandium-zirconium composite hydroxide;

step 2: calcining the resulting hydroxide to obtain an oxide; and step 3: adding alumina to the resulting oxide.

Item 12. A method for producing the scandia-stabilized zirconia sintered body according to any one of Items 6 to 10, the method comprising the following steps 1 to 4:

step 1: mixing a raw material containing a zirconium salt and a raw material containing a scandium salt, and then performing neutralization to obtain a scandium-zirconium composite hydroxide;

step 2: calcining the resulting hydroxide to obtain an oxide;

step 3: adding alumina to the resulting oxide; and step 4: sintering the alumina-containing oxide obtained in step 3.

Item 13. A solid oxide fuel cell comprising the scandia-stabilized zirconia sintered body according to any one of Items 6 to 10 as a constituent element.

Advantageous Effects of Invention

The scandia-stabilized zirconia powder for solid oxide fuel cells according to the present invention has high crystal structure stability. Moreover, the sintered body of this powder has low grain-boundary resistivity, and thus has high ionic conductivity. Accordingly, when the scandia-stabilized zirconia powder is used as a material for solid oxide fuel cells, the solid oxide fuel cells ensure high power generation efficiency.

Since the scandia-stabilized zirconia sintered body for solid oxide fuel cells according to the present invention has high crystal structure stability and low grain-boundary resistivity, it has high ionic conductivity. Accordingly, when the scandia-stabilized zirconia sintered body is used to produce solid oxide fuel cells, the solid oxide fuel cells ensure high power generation efficiency.

The production method of scandia-stabilized zirconia powder according to the present invention is suitable as a method for producing the scandia-stabilized zirconia powder described above.

The production method of scandia-stabilized zirconia sintered body according to the present invention is suitable as a method for producing the scandia-stabilized zirconia sintered body described above.

DESCRIPTION OF EMBODIMENTS

Embodiments of the present invention are described in detail below. In the present specification, the terms "comprise" and "contain" include the concepts of "comprise," "contain," "essentially consist of," and "consist of."

The scandia-stabilized zirconia powder according to the present embodiment is used for solid oxide fuel cells, and comprises a compound represented by the following formula (1):

$$(ZrO_2)_{1-x-a}(Sc_2O_3)_x(Al_2O_3)_a \qquad (1)$$

In formula (1), x is 0.09≤x≤0.11, and a is 0.002≤a<0.01.

Hereinbelow, the compound represented by formula (1) is sometimes abbreviated as "compound A."

In formula (1), the value of x is in the range of 0.09≤x≤0.11. When the value of x is in this range, the crystal structure formed of compound A is stable. The value of x is more preferably 0.095≤x≤0.105, and particularly preferably 0.097≤x≤0.103.

The value of a in formula (1) is 0.002≤a<0.01. When the value of a is in this range, the crystal structure of compound A is stable, and the grain-boundary resistivity of the sintered body of the compound A-containing scandia-stabilized zirconia powder is reduced; thus, a sintered body having high ionic conductivity can be easily formed. If the value of a is less than 0.002, it is difficult for the sintered body of the scandia-stabilized zirconia powder to maintain a cubic crystal phase that is explained later, and the grain-boundary resistivity is increased. If the value of a is 0.01 or more, the grain-boundary resistivity of the sintered body of the scandia-stabilized zirconia powder is increased. The value of a is preferably 0.003≤a≤0.009. In this case, the sintered body of the compound A-containing scandia-stabilized zirconia powder has a particularly low grain-boundary resistivity and higher ionic conductivity. The value of a is particularly preferably 0.004≤a≤0.008.

Compound A contains, as a main component, scandia-stabilized zirconia in the form of a solid solution (hereinbelow abbreviated as "ScSZ") in which scandia ($Sc_2O_3$) is dissolved in zirconia ($ZrO_2$). In the ScSZ, $Al_2O_3$ can be present in an excellent dispersed state. Due to the presence of $Al_2O_3$, the crystal structure of compound A tends to be stable, and compound A has excellent ionic conductivity.

The compound A-containing scandia-stabilized zirconia powder has a rhombohedral phase crystal structure.

The sintered body of the scandia-stabilized zirconia powder according to the present embodiment has a cubic phase crystal structure.

In particular, it is preferable that the sintered body of the scandia-stabilized zirconia powder according to the present embodiment consist of a cubic crystal phase. When the sintered body of the scandia-stabilized zirconia powder consists of a cubic crystal phase, the sintered body has reduced resistivity and high ionic conductivity.

The crystal structures of the scandia-stabilized zirconia powder and its sintered body can be determined from X-ray diffraction peaks analyzed by an X-ray diffraction method (XRD). Specifically, X-ray diffraction measurements of scandia-stabilized zirconia powder are performed. Of the obtained X-ray diffraction peaks, when X-ray diffraction peaks at around 2θ=28° to 320 and 49° to 520 were each split into two peaks, and when an X-ray diffraction peak at around 2θ=59° to 620 was split into four peaks, the phase is determined to be a rhombohedral crystal phase; and when the peaks were not split, the phase is determined to be a cubic crystal phase. The rhombohedral crystal phase can also be referred to as a trigonal crystal phase.

It is preferable that the crystal structure of the sintered body of the scandia-stabilized zirconia powder according to the present embodiment does not change even after heat treatment at 600° C. for 1000 hours. Because of this feature, the sintered body of the scandia-stabilized zirconia powder has low grain-boundary resistivity, and is more likely to have higher ionic conductivity. Moreover, because the crystal structure does not tend to depend on temperature, the durability of solid oxide fuel cells is improved.

The sintered body of the scandia-stabilized zirconia powder according to the present embodiment has a grain-boundary resistivity of 12 Ω·cm or less at 550° C. When the grain-boundary resistivity is in this range, the sintered body of the scandia-stabilized zirconia powder has high ionic conductivity. The grain-boundary resistivity of the sintered body at 550° C. is preferably 10 Ω·cm or less, more preferably 9 Ω·cm or less, and particularly preferably 6 Ω·cm or less.

To provide the sintered body of the scandia-stabilized zirconia powder with higher ionic conductivity, the grain-boundary resistivity of the sintered body of the scandia-stabilized zirconia powder at 500° C. is preferably 60 Ω·cm or less. The grain-boundary resistivity of the sintered body at 500° C. is preferably 50 Ω·cm or less, more preferably 45 Ω·cm or less, and particularly preferably 40 Ω·cm or less.

To provide the sintered body of the scandia-stabilized zirconia powder with higher ionic conductivity, the grain-boundary resistivity of the sintered body of the scandia-stabilized zirconia powder at 450° C. is preferably 200 Ω·cm or less. The grain-boundary resistivity of the sintered body at 450° C. is preferably 150 Ω·cm or less, more preferably 130 Ω·cm or less, and particularly preferably 120 Ω·cm or less.

To provide the sintered body of the scandia-stabilized zirconia powder with higher ionic conductivity, the grain-boundary resistivity of the sintered body of the scandia-stabilized zirconia powder at 400° C. is preferably 1000 Ω·cm or less. The grain-boundary resistivity of the sintered body at 400° C. is preferably 800 Ω·cm or less, more preferably 700 Ω·cm or less, and particularly preferably 600 Ω·cm or less.

The grain-boundary resistivity of the sintered body of the scandia-stabilized zirconia powder exceeds at least 0 Ω·cm at any temperature.

The scandia-stabilized zirconia powder according to the present embodiment is sintered to form a scandia-stabilized zirconia sintered body. As described above, the sintered body has a cubic phase crystal structure, and a grain-boundary resistivity of 12 Ω·cm or less at 550° C. The scandia-stabilized zirconia sintered body can be obtained by sintering the scandia-stabilized zirconia powder at a temperature in the range of 1200 to 1600° C., and preferably at a temperature in the range of 1300 to 1500° C.

Since the crystal structures of the scandia-stabilized zirconia powder and its sintered body according to the present embodiment (scandia-stabilized zirconia sintered body according to the present embodiment) are both easily maintained, the stability of the crystal structures is high. Moreover, the sintered body has low grain-boundary resistivity, and thus has excellent ionic conductivity. Accordingly, when the scandia-stabilized zirconia powder or the scandia-stabilized zirconia sintered body is used as a material for solid oxide fuel cells, the solid oxide fuel cells can attain high power generation efficiency.

The scandia-stabilized zirconia powder according to the present embodiment may contain other additives within a range that does not inhibit the effects of the present invention. For example, the scandia-stabilized zirconia powder may contain a compound other than compound A; or an additive, such as a sintering aid.

Compound A can be produced by various methods, such as a coprecipitation method, a sol-gel method, etc. In particular, it is preferable to produce compound A by a coprecipitation method. In this case, the dispersibility of the $Al_2O_3$ component (alumina component) in compound A tends to be improved. As a result, the crystal structures of the compound A-containing scandia-stabilized zirconia powder and scandia-stabilized zirconia sintered body become stable.

Further, since the scandia-stabilized zirconia sintered body has reduced grain-boundary resistivity and high ionic conductivity, solid oxide fuel cells ensure high power generation efficiency.

In one example, compound A can be produced by a coprecipitation method comprising the following steps 1, 2, and 3.

Step 1: Mixing a raw material containing a zirconium salt and a raw material containing a scandium salt, and then performing neutralization to obtain a scandium-zirconium composite hydroxide;

Step 2: Calcining the resulting hydroxide to obtain an oxide; and

Step 3: Adding alumina to the resulting oxide.

In step 1, a raw material containing a zirconium salt and a raw material containing a scandium salt are mixed to prepare a mixture, and the mixture is neutralized with an alkali to obtain a scandium-zirconium composite hydroxide. The alkali used herein is not particularly limited. Usable examples include sodium hydroxide, potassium hydroxide, ammonium hydroxide, and the like. These alkalis can be used singly, or in a combination of two or more.

The zirconium salt is not particularly limited, as long as it can supply zirconium ions. Examples include zirconium inorganic acid salts, such as zirconium oxynitrate and zirconium oxychloride; zirconium organic acid salts, such as zirconium tetrabutoxide; and the like. The zirconium salt-containing raw material can contain one, or two or more, of the above zirconium salts.

The zirconium salt can be dissolved in a solvent and used as a zirconium salt solution. The solvent is not particularly limited, as long as it can dissolve zirconium salts. Examples include aqueous solvents, such as water; organic solvents, such as methanol and ethanol; and the like. These solvents can be used singly, or in a combination of two or more.

Specific examples of combinations of zirconium salts and solvents are described below. When an aqueous solvent, such as water, is used as the solvent, a zirconium inorganic acid salt, such as zirconium oxynitrate or zirconium oxychloride, can be used as the zirconium salt. Moreover, when an organic solvent, such as methanol or ethanol, is used as the solvent, a zirconium organic acid salt, such as zirconium tetrabutoxide, can be used as the zirconium salt. In the present embodiment, a combination of an aqueous solvent (particularly water) as the solvent, and zirconium oxychloride as the zirconium salt, is preferable in terms of productivity etc. on an industrial scale.

The zirconium salt-containing raw material may consist of a zirconium salt solution.

The scandium salt is not particularly limited, as long as it can supply scandium ions. Examples include scandium inorganic acid salts, such as scandium nitrate, scandium chloride, and scandium oxalate; scandium organic acid salts, such as scandium butoxide; and the like. The scandium salt-containing raw material can contain one, or two or more, of the above zirconium salts.

The scandium salt can be dissolved in a solvent and used as a scandium salt solution. The solvent is not particularly limited, as long as it can dissolve scandium. Examples include aqueous solvents, such as water; organic solvents, such as methanol and ethanol; and the like. These solvents can be used singly, or in a combination of two or more.

Specific examples of combinations of scandium salts and solvents are described below. When an aqueous solvent, such as water, is used as the solvent, a scandium inorganic acid salt, such as scandium nitrate, scandium chloride, and scandium oxalate, can be used as the scandium salt. Moreover, when an organic solvent, such as methanol or ethanol, is used as the solvent, a scandium organic acid salt, such as scandium butoxide, can be used as the scandium salt. In the present embodiment, a combination of an aqueous solvent (particularly water) as the solvent, and scandium chloride as the zirconium salt, is preferable in terms of productivity etc. on an industrial scale.

The scandium salt-containing raw material may consist of a scandium salt solution.

The mixing ratio of the zirconium salt-containing raw material and the scandium salt-containing raw material can be suitably adjusted to a range such that the molar ratio of the zirconium salt and the scandium salt is 1-x-a:x ($0.09 \leq x \leq 0.11$ and $0.002 \leq a < 0.01$), in terms of oxide.

In step 2, the scandium-zirconium composite hydroxide obtained as above is calcined to obtain an oxide. The calcination conditions are, for example, as follows. The calcination temperature can be set to 600 to 1200° C., and preferably 700 to 1100° C. The calcination time can be set to 2 to 10 hours, and preferably 3 to 9 hours. Calcination can be performed under atmospheric pressure, for example.

In step 3, alumina is added to the resulting oxide. The oxide may be subjected to grinding in advance before alumina is added. The addition proportion of alumina is not particularly limited, as long as it is added so as to satisfy formula (1).

After alumina is added, a grinding treatment may be performed with a grinder, such as a ball mill. Such grinding facilitates the dispersion of alumina in the sintered body of compound A to be obtained. After grinding, the obtained powder is dried. Thus, compound A can be obtained. In the drying treatment, for example, the drying temperature can be set to 100 to 250° C., and preferably 110 to 240° C. The drying time can be set to 12 to 120 hours, and preferably 24 to 96 hours. The drying treatment can be performed under atmospheric pressure, for example.

As described above, compound A produced by the coprecipitation method comprising steps 1, 2, and 3 contains, as a main component, scandia-stabilized zirconia (ScSZ) in the form of a solid solution in which scandia ($Sc_2O_3$) is dissolved in zirconia ($ZrO_2$). In the ScSZ, $Al_2O_3$ tends to be present in an excellent dispersed state.

The production method of scandia-stabilized zirconia powder according to the present embodiment is not particularly limited; however, as described above, the production method preferably contains a step of producing compound A by the aforementioned coprecipitation method, because $Al_2O_3$ tends to be present in an excellent dispersed state. That is, the production method of scandia-stabilized zirconia powder preferably includes steps 1, 2, and 3 as described above. By such a production method, the compound A-containing scandia-stabilized zirconia powder can be produced.

The production of scandia-stabilized zirconia powder may include a step of adding a material other than compound A, such as an additive. Examples of additives include a sintering aid etc.

The production method of the scandia-stabilized zirconia sintered body according to the present embodiment is not particularly limited; however, as described above, the production method preferably contains a step of producing compound A by the coprecipitation method described above, because $Al_2O_3$ tends to be present in the ScSZ in an excellent dispersed state.

More specifically, the production method of the scandia-stabilized zirconia sintered body preferably includes steps 1, 2, and 3 as described above; and, additionally, step 4 of sintering the alumina-containing oxide obtained in step 3.

In the sintering of step 4, methods of sintering, such as a cold isostatic pressing (CIP) method and a hot isostatic pressing (HIP) method, can be employed. For example, in the case of CIP, the pressure can be set to 0.3 to 2.5 t/cm$^2$, and preferably 0.5 to 2.0 t/cm$^2$. The sintering temperature can be set to 1200 to 1600° C., and preferably 1300 to 1500° C. The sintering time can be set to 1 to 24 hours, and preferably 2 to 20 hours. Sintering can be performed under atmospheric air, for example.

The scandia-stabilized zirconia powder according to the present embodiment is suitable as a material for solid oxide fuel cells. Specifically, a solid electrolyte can be produced by sintering the scandia-stabilized zirconia powder to form a sintered body (a scandia-stabilized zirconia sintered body), and molding the sintered body into a predetermined shape. The solid electrolyte is used as a solid electrolyte plate for SOFCs. Usable examples of the method for molding the solid electrolyte include a pressure-forming method using a hydrostatic pressure pressing machine, a doctor blade method, and a calender roll method. The molding conditions etc. are not limited, and the same conditions as conventional conditions can be used.

A fuel electrode is formed on one surface of the above solid electrolyte plate, and an air electrode is formed on the opposite surface, thereby obtaining a solid oxide fuel cell comprising a single-cell structure having a fuel electrode on one surface of a solid electrolyte, and an air electrode on the opposite surface.

To form a fuel electrode on one surface of the solid electrolyte plate, a slurry containing ceramic powder for forming the fuel electrode is prepared, and the slurry is applied to one surface of the solid electrolyte plate by the so-called slurry coating method, followed by calcination at a predetermined temperature. A thin film-like fuel electrode is thereby formed on one surface of the solid electrolyte plate. Examples of the ceramic powder for forming the fuel electrode include a Ni-zirconia-cermet material comprising 60 wt % of nickel and 40 wt % of zirconia, and the like. In addition, ceramic powder conventionally used as a fuel electrode can also be used. The thickness of the fuel electrode can be set to, but is not limited to, 50 µm, for example.

In contrast, to form an air electrode on the solid electrolyte plate, a slurry containing ceramic powder for forming the air electrode is applied to one surface of the solid electrolyte plate by a slurry coating method, followed by calcination at a predetermined temperature, as with the formation of the fuel electrode. A thin film-like air electrode is thereby formed on the surface of the solid electrolyte plate opposite to the surface on which the fuel electrode is formed. Examples of the ceramic powder for forming the air electrode include lanthanum strontium manganate (La(Sr)MnO$_3$) and the like. In addition, ceramic powder conventionally used as an air electrode can also be used. The thickness of the air electrode can be set to, but is not limited to, 50 µm, for example.

The solid oxide fuel cell configured as described above comprises a solid electrolyte plate formed with the scandia-stabilized zirconia powder according to the present embodiment, and thus has excellent power generation efficiency. Accordingly, the use of such a solid oxide fuel cell enables the creation of a power generation system having excellent energy efficiency.

EXAMPLES

The present invention is described in more detail below with reference to Examples; however, the present invention is not limited to the aspects of these Examples.

The materials obtained in the Examples and Comparative Examples contain hafnium oxide as an inevitable impurity, in an amount of 1.3 to 2.5 wt. % based on zirconium oxide.

Example 1

A zirconium oxychloride aqueous solution and a scandium chloride aqueous solution were mixed so that the weight ratio of the zirconia component and the scandia component was 88.9:11.1. The amount of water was adjusted so that the total weight of zirconia and scandia was 1 wt. %, thereby obtaining a dispersion. As an alkali, NaOH (sodium hydroxide) was added to the dispersion in an amount 6 times larger than the total weight of the zirconia component and the scandia component, thereby performing neutralization treatment. Thus, a scandium-zirconium composite hydroxide was obtained. The obtained hydroxide was collected by solid-liquid separation, and the obtained solids were calcined in an electric furnace in atmospheric air at 800° C. for 5 hours. Subsequently, alumina was added to the obtained oxide so that the target object had a composition ratio of $(ZrO_2)_{0.895}(Sc_2O_3)_{0.1}(Al_2O_3)_{0.005}$. Thereafter, the resulting mixture was ground with a ball mill and dispersed, followed by drying treatment at 120° C., thereby obtaining a powder.

When the XRD pattern of the resulting powder was measured by an X-ray diffractometer, the XRD pattern of the sample indicated a rhombohedral crystal phase.

Next, after a pressure of 1.0 t/cm$^2$ was applied for 2 minutes to the powder using CIP, the powder was subjected to heat treatment in an electric furnace in atmospheric air at 1450° C. for 2 hours, thereby obtaining a sintered body.

When the XRD pattern of the resulting sintered body was measured by an X-ray diffractometer, the XRD pattern of the sample indicated a cubic crystal phase.

Additionally, the grain-boundary resistivity of the sintered body was measured using an alternating-current impedance method. As a result, the grain-boundary resistivities were 619.0 Ω·cm at 400° C., 109.1 Ω·cm at 450° C., 35.7 Ω·cm at 500° C., and 5.6 Ω·cm at 550° C.

Example 2

A powder and a sintered body were obtained in the same manner as in Example 1, except that the amounts of raw materials were changed so that the compound contained in the powder had a composition ratio of $(ZrO_2)_{0.896}(Sc_2O_3)_{0.1}(Al_2O_3)_{0.004}$.

When the XRD pattern of the resulting powder was measured by an X-ray diffractometer, the XRD pattern of the sample indicated a rhombohedral crystal phase.

When the XRD pattern of the resulting sintered body was measured by an X-ray diffractometer, the XRD pattern of the sample indicated a cubic crystal phase.

Additionally, the grain-boundary resistivity of the sintered body was measured using an alternating-current impedance method. As a result, the grain-boundary resistivities were 548.7 Ω·cm at 400° C., 127.9 Ω·cm at 450° C., 36.2 Ω·cm at 500° C., and 8.3 Ω·cm at 550° C.

Example 3

A powder and a sintered body were obtained in the same manner as in Example 1, except that the amounts of raw materials were changed so that the compound contained in the powder had a composition ratio of $(ZrO_2)_{0.897}(Sc_2O_3)_{0.1}(Al_2O_3)_{0.003}$.

When the XRD pattern of the resulting powder was measured by an X-ray diffractometer, the XRD pattern of the sample indicated a rhombohedral crystal phase.

When the XRD pattern of the resulting sintered body was measured by an X-ray diffractometer, the XRD pattern of the sample indicated a cubic crystal phase.

Additionally, the grain-boundary resistivity of the sintered body was measured using an alternating-current impedance method. As a result, the grain-boundary resistivities were 592.0 Ω·cm at 400° C., 142.2 Ω·cm at 450° C., 42.1 Ω·cm at 500° C., and 9.5 Ω·cm at 550° C.

The sintered body obtained in Example 3 was further subjected to heat treatment under atmospheric pressure at 600° C. for 1000 hours. Thereafter, when the XRD pattern was measured by an X-ray diffractometer, the XRD pattern of the sintered body indicated a cubic crystal phase.

Comparative Example 1

A powder and a sintered body were obtained in the same manner as in Example 1, except that the amounts of raw materials were changed so that the compound contained in the powder had a composition ratio of $(ZrO_2)_{0.899}(Sc_2O_3)_{0.1}(Al_2O_3)_{0.001}$.

When the XRD pattern of the resulting powder was measured by an X-ray diffractometer, the XRD pattern of the sample indicated a rhombohedral crystal phase.

When the XRD pattern of the resulting sintered body was measured by an X-ray diffractometer, the XRD pattern of the sample indicated a rhombohedral crystal phase.

Comparative Example 2

A powder and a sintered body were obtained in the same manner as in Example 1, except that the amounts of raw materials were changed so that the compound contained in the powder had a composition ratio of $(ZrO_2)_{0.89}(Sc_2O_3)_{0.1}(Al_2O_3)_{0.01}$.

When the XRD pattern of the resulting powder was measured by an X-ray diffractometer, the XRD pattern of the sample indicated a rhombohedral crystal phase.

When the XRD pattern of the resulting sintered body was measured by an X-ray diffractometer, the XRD pattern of the sample indicated a cubic crystal phase.

Additionally, the grain-boundary resistivity of the sintered body was measured using an alternating-current impedance method. As a result, the grain-boundary resistivities were 1036.4 Ω·cm at 400° C., 217.7 Ω·cm at 450° C., 60.8 Ω·cm at 500° C., and 13.7 Ω·cm at 550° C.

Comparative Example 3

A powder and a sintered body were obtained in the same manner as in Example 1, except that the amounts of raw materials were changed so that the compound contained in the powder had a composition ratio of $(ZrO_2)_{0.84}(Sc_2O_3)_{0.1}(Al_2O_3)_{0.06}$.

The grain-boundary resistivity of the sintered body was measured using an alternating-current impedance method. As a result, the grain-boundary resistivities were 1345.7 Ω·cm at 400° C., 295.9 Ω·cm at 450° C., 81.9 Ω·cm at 500° C., and 19.6 Ω·cm at 550° C.

Comparative Example 4

A powder and a sintered body were obtained in the same manner as in Example 1, except that the amounts of raw materials were changed so that the compound contained in the powder had a composition ratio of $(ZrO_2)_{0.82}(Sc_2O_3)_{0.1}(Al_2O_3)_{0.08}$.

The grain-boundary resistivity of the sintered body was measured using an alternating-current impedance method. As a result, the grain-boundary resistivities were 2069.0 Ω·cm at 400° C., 467.5 Ω·cm at 450° C., 132.2 Ω·cm at 500° C., and 31.9 Ω·cm at 550° C.

X-Ray Diffraction Method

The crystal structure was determined from spectra obtained by X-ray diffraction (XRD) measurement. The X-ray diffraction measurement was performed using a "MiniFlex II" (produced by Rigaku Corporation) with CuKα1 radiation at 2θ of 20° to 80° at room temperature. Specifically, of the X-ray diffraction peaks obtained in the X-ray diffraction measurements of the powder or sintered body performed in each Example, when X-ray diffraction peaks at around 2θ=28° to 32° and 49° to 52° were each split into two peaks, and when an X-ray diffraction peak at around 2θ=59° to 62° was split into four peaks, the phase was determined to be a rhombohedral crystal phase; and when the peaks were not split, the phase was determined to be a cubic crystal phase.

Measurement of Electrical Conductivity by Alternating-Current Impedance Method

An impedance meter (HP4194A) was used for the measurement of electrical conductivity. The measurement was performed while the frequency range of the impedance meter was set to 100 Hz to 10 MHz. The electrical conductivity was measured by plotting (Arrhenius plotting) the relationship between electrical conductivity and temperature by complex impedance analysis in a temperature range of 300 to 800° C., and the grain-boundary resistivity was calculated.

Comparisons between the Examples and the Comparative Examples indicated that the sintered body of the scandia-stabilized zirconia powder containing the compound represented by $(ZrO_2)_{1-x-a}(Sc_2O_3)_x(Al_2O_3)_a$ (0.09≤x≤0.11, and 0.002≤a<0.01) had low grain-boundary resistivity. Accordingly, the sintered body of the scandia-stabilized zirconia powder is a material suitable for solid oxide fuel cells having high ionic conductivity.

INDUSTRIAL APPLICABILITY

The scandia-stabilized zirconia powder for solid oxide fuel cells according to the present invention can become a sintered body having grain-boundary resistivity lower than before and high ionic conductivity; accordingly, the solid oxide fuel cells can have excellent power generation efficiency. The scandia-stabilized zirconia powder for solid oxide fuel cells is therefore useful as an electrolyte material for solid electrolytes constituting solid oxide fuel cells.

The invention claimed is:

1. A scandia-stabilized zirconia powder for solid oxide fuel cells, comprising
$ZrO_2$, $Sc_2O_3$, $Al_2O_3$,
wherein
the $Sc_2O_3$ is dissolved in the $ZrO_2$,
a molar ratio of the $ZrO_2$, the $Sc_2O_3$, and the $Al_2O_3$ in the scandia-stabilized zirconia powder is $(ZrO_2)_{1-x-a}$: $(Sc_2O_3)_x$: $(Al_2O_3)_a$, in which x is 0.097≤x≤0.103 and a is 0.002≤a<0.01,
the scandia-stabilized zirconia powder having a rhombohedral phase crystal structure,
the scandia-stabilized zirconia powder is effective for producing a sintered body that consists of a cubic phase crystal structure, and that has a grain-boundary resistivity of 12 Ω·cm or less at 550° C., and
the sintered body is produced by applying a pressure of 1.0 t/cm² to the scandia-stabilized zirconia powder, and sintering the scandia-stabilized zirconia powder at 1450° C. for 2 hours.

2. The scandia-stabilized zirconia powder according to claim 1, wherein the sintered body has a grain-boundary resistivity of 60 Ω·cm or less at 500° C.

3. The scandia-stabilized zirconia powder according to claim 1, wherein the sintered body has a grain-boundary resistivity of 200 Ω·cm or less at 450° C.

4. The scandia-stabilized zirconia powder according to claim 1, wherein the sintered body has a grain-boundary resistivity of 1000 Ω·cm or less at 400° C.

5. The scandia-stabilized zirconia powder according to claim 1, wherein the crystal structure of the sintered body does not change even after heat treatment at 600° C. for 1000 hours.

6. A scandia-stabilized zirconia sintered body for solid oxide fuel cells, comprising a compound represented by the following formula (1):

$$(ZrO_2)_{1-x-a}(Sc_2O_3)_x(Al_2O_3)_a \quad (1)$$

wherein x is 0.097≤x≤0.103, and a is 0.002≤a<0.01, and
wherein the sintered body consists of a cubic phase crystal structure, and has a grain-boundary resistivity of 12 Ω·cm or less at 550° C., and is obtainable by sintering the scandia-stabilized zirconia powder according to claim 1 by applying a pressure of 1.0 t/cm² to the scandia-stabilized zirconia powder, and sintering the scandia-stabilized zirconia powder at 1450° C. for 2 hours.

7. The scandia-stabilized zirconia sintered body according to claim 6, wherein the sintered body has a grain-boundary resistivity of 60 Ω·cm or less at 500° C.

8. The scandia-stabilized zirconia sintered body according to claim 6, wherein the sintered body has a grain-boundary resistivity of 200 Ω·cm or less at 450° C.

9. The scandia-stabilized zirconia sintered body according to claim 6, wherein the sintered body has a grain-boundary resistivity of 1000 Ω·cm or less at 400° C.

10. The scandia-stabilized zirconia sintered body according to claim 6, wherein the crystal structure does not change even after heat treatment at 600° C. for 1000 hours.

11. A method for producing the scandia-stabilized zirconia powder according to claim 1, the method comprising the following steps 1 to 3:
step 1: mixing a raw material containing a zirconium salt and a raw material containing a scandium salt, and then performing neutralization to obtain a scandium-zirconium composite hydroxide;
step 2: calcining the resulting hydroxide to obtain an oxide; and
step 3: adding alumina to the resulting oxide,
wherein an amount of each of the zirconium salt-containing raw material, the scandium salt-containing raw material, and the alumina is adjusted to a range such that a molar ratio of the zirconium salt, the scandium salt, and the alumina is $(ZrO_2)_{1-x-a}$: $(Sc_2O_3)_x$: $(Al_2O_3)_a$, in which x is 0.097≤x≤0.103 and a is 0.002≤a<0.01.

12. A method for producing the scandia-stabilized zirconia sintered body according to claim 6, the method comprising the following steps 1 to 4:
step 1: mixing a raw material containing a zirconium salt and a raw material containing a scandium salt, and then performing neutralization to obtain a scandium-zirconium composite hydroxide;

step 2: calcining the resulting hydroxide to obtain an oxide;

step 3: adding alumina to the resulting oxide; and step 4: sintering the alumina-containing oxide obtained in step 3, of 1.0 t/cm² to the alumina-containing, oxide obtained in step 3, and sintering the alumina-containing oxide at 1450° C. for 2 hours, wherein an amount of each of the zirconium salt-containing raw material, the scandium salt-containing raw material, and the alumina is adjusted to a range such that a molar ratio of the zirconium salt, the scandium salt, and the alumina is $(ZrO_2)_{1-x-a}$: $(Sc_2O_3)_x$: $(Al_2O_3)_a$, in which x is $0.097 \leq x \leq 0.103$ and a is $0.002 \leq a < 0.01$.

13. A solid oxide fuel cell comprising the scandia-stabilized zirconia sintered body according to claim 6 as a constituent element.

\* \* \* \* \*